Aug. 11, 1959 — R. L. MUELLER ET AL — 2,899,588
GASEOUS DISCHARGE DEVICE
Filed May 9, 1956

INVENTORS RALPH L. MUELLER
W. G. STIERITZ
BY
ATTORNEY

2,899,588

GASEOUS DISCHARGE DEVICE

Ralph L. Mueller, Emmaus, and William G. Stieritz, Allentown, Pa.; said Mueller assignor to Western Electric Company, Incorporated, New York, N.Y., a corporation of New York; said Stieritz assignor to Bell Telephone Laboratories, Incorporated, New York, N.Y., a corporation of New York Application May 9, 1956, Serial No. 583,665

13 Claims. (Cl. 313—209)

This invention relates to gaseous discharge devices and more particularly to such devices of the cold cathode glow discharge type.

It is known that gaseous discharge devices having but a pair of electrodes may by proper correlation, cathode configuration, anode positioning, and gas pressure have a stable reproducible negative resistance portion of the current-voltage characteristic in the abnormal discharge region over a wide range of currents and frequencies. Such gaseous diodes having hollow cathode structures are fully disclosed in United States Patent No. 2,804,565, issued August 27, 1957, to M. A Townsend. Further advantages result when the cathode has a particular structure, herein referred to as a cavity cathode, as disclosed in application Serial No. 583,671, filed May 9, 1956, of A. D. White. In a cavity cathode the cathode comprises a metallic member or members defining a small spherical cavity communicating to the anode-cathode gap through a small orifice at one edge of the cathode. The dimensions of the cavity cathode are determined in relationship to the gas, gas pressure, and secondarily the anode positioning to obtain the negative resistance characteristic in the abnormal discharge region. In such cathodes the discharge originates from within the hollow or hollow spherical portion and extends through the constricting orifice, and advantageously the outside surface of the cathode may be coated to reduce any tendency of the discharge to remain at this surface.

Such discharge devices may advantageously be employed in telephone switching networks of the type disclosed in Patent 2,684,405, issued July 20, 1954, of E. Bruce and H. M. Straube, wherein the gaseous diodes define crosspoints in the network and in the talking paths through the network. In each such network exceedingly large numbers of these diodes may be employed, depending on the size of the network. Accordingly, it is highly desirable that these diodes be fabricated in the most efficient and economical manner. At the same time it is necessary during the fabrication to comply with the very precise requirements requisite to the attainment of the desired negative A.-C. resistance characteristic.

It is an object of this invention to provide an improved gaseous discharge device and specifically to provide an improved device of the cavity cathode type having a negative resistance characteristic in the abnormal discharge region.

It is another object of this invention to provide improved cathode structures for such gaseous discharge devices.

It is a further object of this invention to reduce the cost of manufacture of such gaseous discharge devices and to facilitate their manufacture.

These and other objects of this invention are attained in one specific illustrative embodiment of a gaseous discharge device comprising an elongated envelope of glass having a gaseous atmosphere therein. A single lead extends through one end of the envelope and is advantageously of a metal such as Kovar which may readily be sealed to glass; butt welded to the end of this lead is a molybdenum wire of the same size and dimensions as the lead, the two together comprising the cathode lead wire. A molybdenum cap having a hollow hemispherical portion and extending cylindrical side portions is pushed over the end of the cathode lead in snug fitting relationship and advantageously secured thereto as by crimping to hold the cap firmly in place. The cap has a hole or aperture in it along the axis of the wire, and the cap is spaced on the wire so that the cap and the end of the cathode lead wire jointly define a cavity directly under the hole. This cavity, in accordance with an aspect of this invention, is of such size that during an aging cycle, as disclosed in A. D. White application Serial No. 583,671, filed May 9, 1956, some erosion of the wire and some filling in of the cavity due to ion bombardment will form the cavity into a substantially hollow spherical shape. The tube may have negative resistance at the start of the aging cycle before this erosion and filling take place. In the absence of negative resistance the tube will either have positive resistance or more likely be self-oscillating in its aging circuit. We have found that the size of the hole or aperture has an important bearing on whether the tube oscillates or has suitable negative resistance at the start of aging. However, we have also found that the tube does not acquire a negative resistance characteristic that is stable with long operation time until the hollow cavity is very nearly spherical.

Extending through the other end of the envelope is a hollow tubulation, to the inner end of which at one side is secured, as by welding, a molybdenum wire which serves as the anode itself. The anode is advantageously positioned off-center and not on the axis of the cathode to prevent the growing of sputtered molybdenum whiskers due to cathode bombardment during operation of the tube. The anode support tubing advantageously can serve as the pumping tubulation for exhausting and filling the envelope with a gaseous atmosphere.

The end of the anode wire is positioned from the outer surface of the cathode cap a distance to give the desired breakdown voltage and is correlated with the size of the orifice, the size of the hollow spherical cavity, choice of gas or gaseous mixture, and the gaseous pressure to attain the negative resistance characteristic.

It is a feature of this invention that a gaseous discharge device include a cathode defined by a cap fitting over the end of a solid support rod and secured thereto, the cap having an aperture therein and defining with the end of the support rod a hollow cavity from which the discharge emanates through the aperture or orifice in the cap.

It is a further feature of this invention that the end of the cathode lead be concave and the cap be of a substantially hemispherical interior, so that the end of the cathode and the cap together define the substantially hollow spherical volume of the cavity cathode. Further in accordance with this feature of the invention, the configuration of the end of the lead may be self-formed by erosion of the lead during aging of the device.

A complete understanding of this invention and of these and other features thereof may be gained from consideration of the following detailed description and the accompanying drawing in which.

Figure 1:
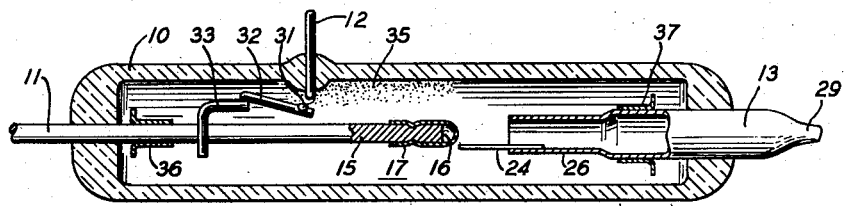
Fig. 1 is a sectional view of a gaseous discharge device illustrative of one specific embodiment of this invention.

Referring now to the drawing, the specific illustrative embodiment of this invention depicted in Fig. 1 comprises an envelope 10 which may advantageously be of glass and has three electrical leads 11, 12, and 13 extending therethrough, as discussed further below. The envelope advantageously has a gaseous atmosphere therein as of neon at pressures of the order of 70 to 120 millimeters of mercury, although other gases and gaseous mixtures at different pressures may be employed, as is known in the art.

Lead 11 extends through the base of the envelope 10 and is sealed thereto, the lead advantageously being of a metal such as Kovar, which is readily sealed to glass. Secured to the end of lead 11 as by butt welding is a wire 15 of a material suited for employment as a cold cathode, such as molybdenum, although other materials may also be employed. The wire 15 and the terminal 11 together comprise the cathode lead wire and shall be referred to as such hereinafter as if it were a single integral wire, rather than a composite wire. The wire 15 is a solid wire and advantageously initially during the fabrication of the device has a flat end 16, as shown in Figs. 1 and 2.

Secured to the end of the lead 15 and closely adjacent the surface 16 is a cap 17 having an aperture 18 therein advantageously situated along the axis of the wire 15. The cap 17 has a hemispherical portion 19 and depending cylindrical side portion 20 by which it is secured to the lead 15 as by crimping, as shown at 21 in Fig. 2 of the drawing. The cathode cap 17 advantageously is of the same material as the wire 15, such as molybdenum, and may be formed of a cathode sleeve formed from strip stock having its end spun over to form the hemispherical portion 19 with the small orifice or opening 18 at the center of the end. In fabrication the cathode cap 17 is pushed over the snug fitting wire 15 and spaced on the wire so that the cavity or volume defined by the hemispherical portion 19 of the cap and the end 16 of the wire 15 is left directly under the aperture 18. The outer surface of the cathode cap 17 is advantageously coated with a thin coating of aluminum oxide or other material known in the art to reduce the tendency for the tube to conduct current to the outside of the cathode. Thus, this coating tends to force the glow into the hollow cavity portion defined by the hemispherical portion 19 and the end 16 of the wire 15.

Figure 2:
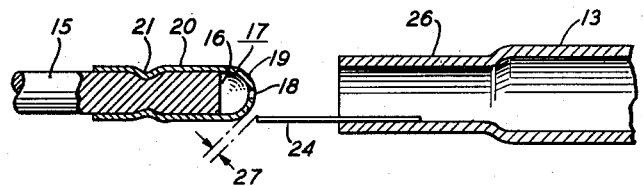
Fig. 2 is an enlarged view of the anode-cathode gap and of the cathode structure of the embodiment of Fig. 1 following fabrication of the device but prior to formation of the spherical hollow cavity cathode.
Figure 3:
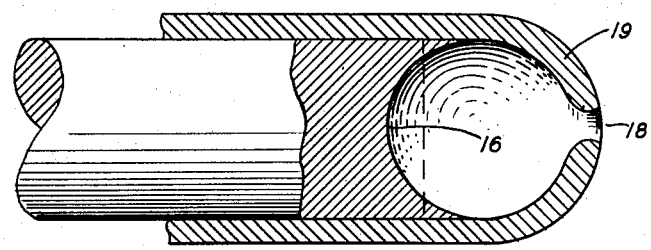
Fig. 3 is a cross-sectional view of the cathode of the embodiment of Fig. 1 following the aging process and showing particularly the spherical hollow volume of the cavity cathode.

The cavity thus defined is of such a size that some erosion of the end 16 of the wire 15 and some filling in of the cavity due to ion bombardment will form the cavity into a spherical hollow shape, as seen in Fig. 3. This figure, which is actually a photomicrograph of a cross section of an actual cathode structure in accordance with this invention, particularly shows the concave shape of the end 16 of the wire 15 after the aging cycle. One specific aging cycle that may be employed to form the cathode from the configuration shown in Fig. 2 to that shown in Fig. 3 comprises passing a current of .010 ampere through the tube after it has been sealed for a period of the order of 240 hours. This current is equal to the normal operating current for this device.

The anode in this specific embodiment comprises a length of wire 24 secured as by welding to the tubing 13 having its inner end 26 flattened to give the proper off-center anode wire spacing 27, as seen in Fig. 2. The anode wire 24 may also advantageously be of molybdenum, although other metals known in the art may be employed. Similarly, the anode support terminal 13 may advantageously be of Kovar to facilitate sealing of the support to the envelope 10. In addition to serving as the anode support and terminal, the tubing 13 serves as the pumping tubulation and is welded flat, as at 29, to form the final vacuum seal.

The anode wire 24 is advantageously off-center, that is, not lined up with the aperture 18 along the axes of wire 15 and terminal 13 in order to prevent the growing of sputtered molybdenum whiskers from cathode bombardment during the life and operation of the device. Also, the anode 24 is located at a distance 27 from the cathode cap 17 to give the proper breakdown voltage, and the size of the wire 24 is similarly chosen in view of this desired breakdown voltage.

The terminal 12, which may also be a Kovar wire, extends through the side of the tube and is directly adjacent the getter 31, which may be a barium getter, mounted on a U-shaped support 32 secured by a short wire 33 to lead terminal 11. Accordingly, the getter 31 is mounted on the cathode lead and positioned so that the getter flash 35 is deposited onto the inner wall of the envelope 10 adjacent to the gap between the cathode and the anode and also so that the flash 35 makes contact with the side lead 12. As the getter flash should be isolated from both the cathode and the anode leads 11 and 13, eyelets 36 and 37, which may be of nickel, are secured as by welding to the cathode lead 11 and the tubing 13, respectively, to mask the glass-to-metal seals so that there will be no leakage at the ends.

The getter flash 35 acts as a photosensitive surface which, when connected to the cathode as by the lead 12 and an external resistor which may be of the order of 51 megohms, provides residual ionization in the anode-cathode gap when exposed to ambient light, thereby enabling rapid starting of breakdown. Advantageously, the connection between the getter flash 35 and the cathode is made through a high resistance in order to reduce the ion current to the getter 35 when the main gap is conducting. Currents of the order of several microamperes may be detrimental to the photosensitive characteristics of the surface of the getter flash 35 and may cause deterioration with light.

In one specific illustrative embodiment of this invention as depicted in Fig. 1 the outside diameter of the envelope 10 was approximately .286 inch, and the length of the envelope 10 was of the order of 1¹³⁄₃₂ inches. Wires 11 and 15 were each of ¹⁄₃₂ inch diameter, and the cavity initially under the hemispherical cap portion 19 was .030 inch from the flat end 16 of the wire 15 to the outer surface of the hemispherical portion 19 adjacent the orifice or aperture 18. The cap 17 itself was of .005 inch thick and the opening or orifice 18 was approximately .006 inch.

In this specific embodiment the anode wire 24 was of .003 inch diameter molybdenum wire and was spaced from the cathode a distance 27 of substantially .005 inch. The envelope 10 was filled with pure neon at a pressure of 95 millimeters of mercury and had an operating current of the order of .010 ampere.

The various materials employed in the device, the diameters and lengths of the various elements of the device should be carefully selected to give the required thermal characteristics over the temperature range over which the device is expected to operate. The electrical A.-C. impedance of the diode is affected by the gas density at the cathode and therefore by the relation between cathode and bulb temperatures. Rapid changes during the first few seconds of operation are effected by the thermal capacity of the cathode and the thermal impedance of the support. These are balanced shortly thereafter by heating of the bulb and the entire volume of the gas in the tube so that later changes are effected by bulb diameter and total bulb surface. Accordingly, in order to attain the best thermal characteristics it is advantageous in the design of tubes in accordance with this invention to correlate the bulb diameter, the diameters of the various leads, and the materials involved.

By employing cathodes in accordance with this invention considerable economies in their fabrication can be effected while still attaining the desirable negative resistance characteristic of the cavity cathode. As can be seen in Fig. 3 of the drawing, the final cathode configuration during operation of the device is of a substantially hollow spherical cavity having an orifice 18 communicating through the outer wall of the cavity to the anode-cathode gap. In this specific illustrative embodiment wherein the orifice was of the order of .006 inch the spherical cavity had a diameter of .030 inch.

Fig. 3, which is a copy of a photomicrograph of the formed cavity cathode in accordance with this invention, illustrates the erosion of the central portion of the end 16 of the lead 15 and the build-up, by deposition of the eroded material, of the outer parts of the end 16. As can be seen in the figure, the cavity is not perfectly spherical but is generally slightly deeper than its width. Further, as can be seen from a comparison of Figs. 2 and 3, some erosion or deposition at the orifice 18 may also occur.

During the aging process the resistance of the tube may be positive or the tube may be subject to oscillations so that a true value of resistance cannot be obtained. We have found that the size of the orifice 18 affects the attainment of negative resistance. Should this aperture be too large, the tube may oscillate. In this case the aperture and cavity will take shape together as aging progresses. If the aperture is initially of proper size, then the tube resistance may be negative initially and subsequently shaping affects the cavity only. The cavity and aperture will attain a particular size and shape dependent upon tube operating current, filling gas pressure, thermal impedances, and many other factors. It is observed that the cathode material will be removed and redeposited inside the cavity to form the final spherical shape. Inside and outside the aperture cathode material will also be removed if there is an excess over that required by the final shape or will be deposited from material within the cavity if there is a small deficiency under that needed to form the final shape.

We have found that the negative resistance does not stabilize until the cavity is almost completely spherical with the slight elongation along the axis of the lead, as shown in Fig. 3. For a specific illustrative embodiment having the dimensions indicated above, a forming or aging cycle of .010 ampere for a period of 240 hours resulted in a cathode as shown in Fig. 3 having a negative resistance of the order of 200 ohms at a normal operating current of .010 ampere and an anode-cathode voltage of 100.5 volts.

Another aging cycle of 72 hours at a current of .013 ampere followed by 168 hours at a current of .010 ampere has been employed successfully. Other cycles such as high current pulsing at some low duty cycle are also possible methods of aging.

A reduction in aging time may be realized in other specific illustrative embodiments in accordance with this invention wherein the end 16 of the cathode lead wire 15 is preformed to a hemispherical cup shape.

Cathodes in accordance with this invention can be fabricated very economically and expeditiously, as the caps 17 can be readily made by mass production methods and the caps assembled onto the lead by automatic machinery. Thus, even though the cathode structure is critical and of small dimensions, it can readily be fabricated in large quantities in accordance with our invention.

It is to be understood that the above-described arrangements are illustrative of the application of the principles of the invention. Numerous other arrangements may be devised by those skilled in the art without departing from the spirit and scope of the invention.

What is claimed is:

1. A gaseous discharge device comprising an envelope having a gaseous atmosphere therein, a cathode lead wire extending through one end of said envelope and having a solid end within said envelope, a hollow cap of conductive material fitted onto said lead end and secured thereto, the interior of said cap being substantially hemispherical and said cap having an aperture therein and defining with the solid end of said lead an enclosed volume, and an anode within said envelope and mounted in proximity to said aperture, the end of said lead being substantially hemispherically concave so that said enclosed volume is substantially spherical, whereby said cavity has a negative resistance characteristic in the abnormal discharge region.

2. A gaseous discharge device comprising an envelope having a gaseous atmosphere therein, a cathode lead wire extending through one end of said envelope and having a solid end within said envelope, a cap member of the same material as said lead wire having a hollow hemispherical portion and cylindrical side portions, said cap member fitting over said lead end such that said lead end is directly adjacent said hollow hemispherical portion and defines therewith an enclosed volume and said cap member hemispherical portion having an aperture therein, an anode within said envelope and in proximity to said aperture, and a discharge deterrent coating on the outer surface of said cap hemispherical portion, whereby the discharge originates within said enclosed volume and emanates toward said anode through said aperture.

3. A gaseous discharge device comprising an envelope having a gaseous atmosphere therein, a lead wire extending through one end of said envelope and having a solid concave end within said envelope, a hollow cap of conductive material having a substantially hemispherical interior fitted onto said lead end and secured thereto, said cap having an aperture therein substantially along the axis of said lead and defining with the concave end of said lead a substantially spherical enclosed volume, and an anode mounted within said tube in proximity to said aperture.

4. A gaseous discharge device comprising an envelope having a gaseous atmosphere therein, a lead wire extending through one end of said envelope and having a solid end within said envelope, a cap member of conductive material having a hollow hemispherical portion fitted onto said lead wire end and secured thereto, said hemispherical portion having an aperture therein and defining with the solid end of said lead an enclosed volume of a depth of the order of the diameter of said hemispherical portion whereby the interior surface of said hemispherical portion and the end of said wire jointly define the cathode of the device, and an anode within said envelope and mounted in proximity to said aperture.

5. A gaseous discharge device in accordance with claim 4 wherein said lead end is concave and said enclosed volume is of substantially spherical shape.

6. A gaseous discharge device in accordance with claim 5 wherein said enclosed volume is slightly elongated along the axis of said lead.

7. A gaseous discharge device in accordance with claim 6 wherein said cap member is of molybdenum and said lead wire has a first portion of molybdenum adjacent said cap member and a second portion adjacent said envelope of a different metal.

8. A gaseous discharge device comprising an envelope having a gaseous atmosphere therein, a first lead wire extending through one end of said envelope and having a solid end within said envelope, a cap member of the same material as said lead wire having a hollow hemispherical and cylindrical side portions, said cap member fitting over the end of said first lead and being secured thereto by said cylindrical side portions and said hemispherical portion having an aperture therein and defining with the solid end of said lead an enclosed volume of a depth of the order of the diameter of said hemispherical portion whereby the interior surface of said hemispherical portion and the end of said wire jointly define the cathode of the device, and a second lead wire extending through the opposite end of said envelope, said second lead wire being hollow and having a portion extending toward said cap member and defining an anode.

9. A gaseous discharge device in accordance with claim 8 wherein said aperture is substantially along the axis of said first lead wire, said first and second lead wires are substantially aligned, and said anode portion is offset from the axis of said second lead wire.

10. A gaseous discharge device in accordance with claim 9 wherein the end of said first lead wire is concave, said enclosed volume being substantially spherical.

11. A cathode structure for a gaseous discharge device having a negative resistance characteristic in the abnormal discharge region comprising a solid lead having a concave end and a hollow cap member of the same material as said lead fitting over said end and secured to said lead, said cap member having an aperture therein along the axis of said lead and defining therewith a substantially spherical enclosed volume from which the discharge originates, the discharge emanating out of said aperture.

12. A cathode structure in accordance with claim 11 further comprising a discharge deterrent coating on the outer surface of said cap member.

13. A cathode structure for a gaseous discharge device having a negative resistance characteristic in the abnormal discharge region comprising a solid lead and a hollow cap member of conductive material fitting over the end of said lead and secured thereto, said cap member having an aperture therein along the axis of said lead and the interior of said hollow cap member and the end of said lead being shaped to define a substantially spherical volume, slightly extended along the axis of said lead.

References Cited in the file of this patent

UNITED STATES PATENTS

| | | |
|---|---|---|
| 1,834,251 | Moore | Dec. 1, 1931 |
| 1,991,480 | Williams | Feb. 19, 1935 |
| 2,190,308 | Blackburn | Feb. 13, 1940 |
| 2,228,327 | Spanner | Jan. 14, 1941 |
| 2,433,809 | Clapp | Dec. 30, 1947 |
| 2,716,713 | Noel | Aug. 30, 1955 |